United States Patent [19]

Yamato

[11] Patent Number: 5,175,952
[45] Date of Patent: Jan. 5, 1993

[54] FISHING ROD AND METHOD OF MANUFACTURING SAME

[75] Inventor: Yoshiro Yamato, Shimonoseki, Japan

[73] Assignee: Shimano Industrial Co., Ltd., Osaka, Japan

[21] Appl. No.: 731,991

[22] Filed: Jul. 18, 1991

[30] Foreign Application Priority Data

Jul. 20, 1990 [JP] Japan ................. 2-77760[U]
Jul. 24, 1990 [JP] Japan ................. 2-78341[U]

[51] Int. Cl.$^5$ ............................... A01K 87/00
[52] U.S. Cl. ......................... 43/18.1; 156/173
[58] Field of Search ............. 43/18.1, 18.5, 24; 428/7, 9, 36.4, 36.91; 156/190, 189, 188, 173, 175

[56] References Cited

U.S. PATENT DOCUMENTS

| | | |
|---|---|---|
| 1,625,510 | 4/1927 | Tredwell .............. 43/18.1 |
| 2,702,959 | 3/1955 | Wiglesworth .......... 43/24 |
| 4,043,074 | 8/1977 | Airhart .............. 43/18.5 |
| 4,070,127 | 1/1978 | Loomis et al. ........ 43/18.5 |
| 4,490,063 | 12/1984 | Aho ................. 156/173 |
| 4,653,216 | 3/1987 | Inoue ............... 43/18.5 |

FOREIGN PATENT DOCUMENTS

| | | |
|---|---|---|
| 1540485 | 9/1968 | France ............... 43/18.1 |
| 2531610 | 2/1984 | France ............... 43/18.1 |
| 63-18068 | 2/1988 | Japan . |
| 0394023 | 3/1974 | U.S.S.R. ............. 43/24 |
| 2209913 | 6/1989 | United Kingdom ....... 43/18.1 |

*Primary Examiner*—Richard K. Seidel
*Assistant Examiner*—James Miner
*Attorney, Agent, or Firm*—Dickstein, Shapiro & Morin

[57] ABSTRACT

A fishing rod includes an outer rod section, and an inner rod section inserted into the outer rod section for telescopic movement. The inner rod section is retainable in an extended position and a compressed position relative to the outer rod section. The inner rod section includes a tapered portion extending from an intermediate position to a tip end thereof and tapering toward the tip end, and a straight portion extending from the intermediate position to a rear end. Further, the inner rod section defines an inside wall becoming progressively thicker from the intermediate position to the rear end. The inner rod section is manufactured by using a mandrel having a tapered outer surface tapering from an intermediate position to a forward end, and a straight outer surface from the intermediate position to a rear end thereof. A polypropylene sheet is wound on the mandrel to form an intermediate swell, and then a prepreg is wound on the polypropylene sheet such that an outer surface thereof rearwardly of the intermediate swell extends parallel to the straight outer surface of the mandrel. The resulting product is baked, and thereafter the mandrel and the polypropylene sheet are removed to complete the inner rod section which is fitted in the outer rod section.

11 Claims, 4 Drawing Sheets

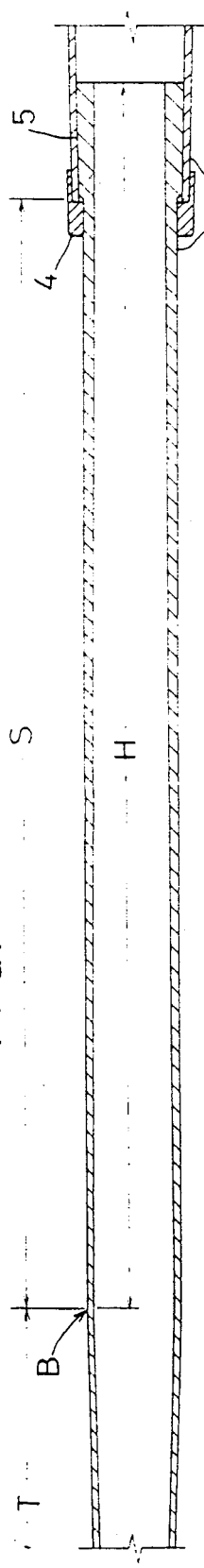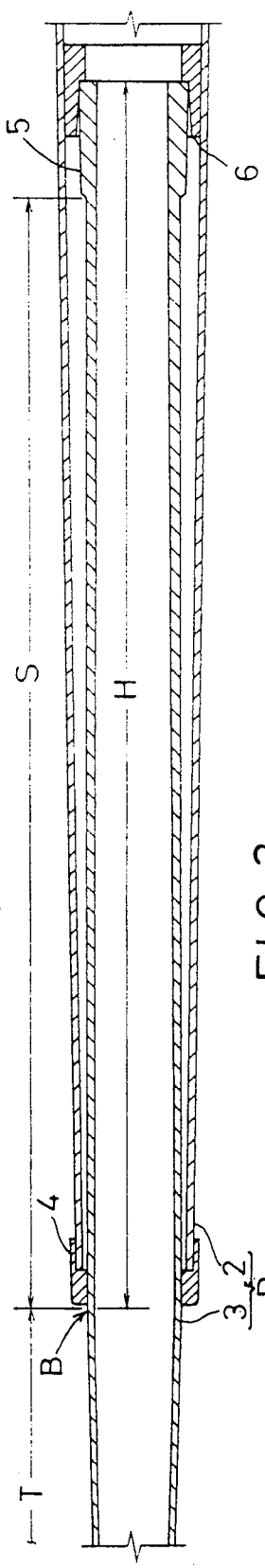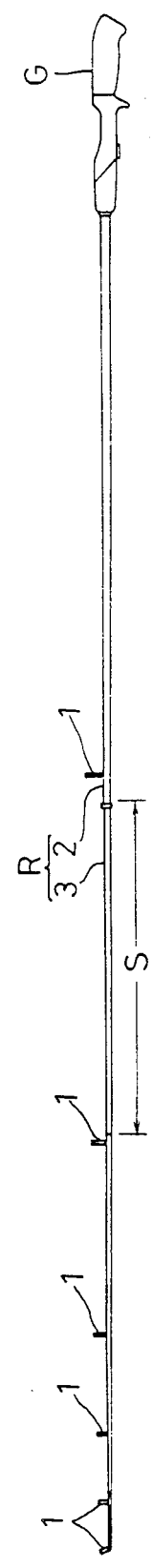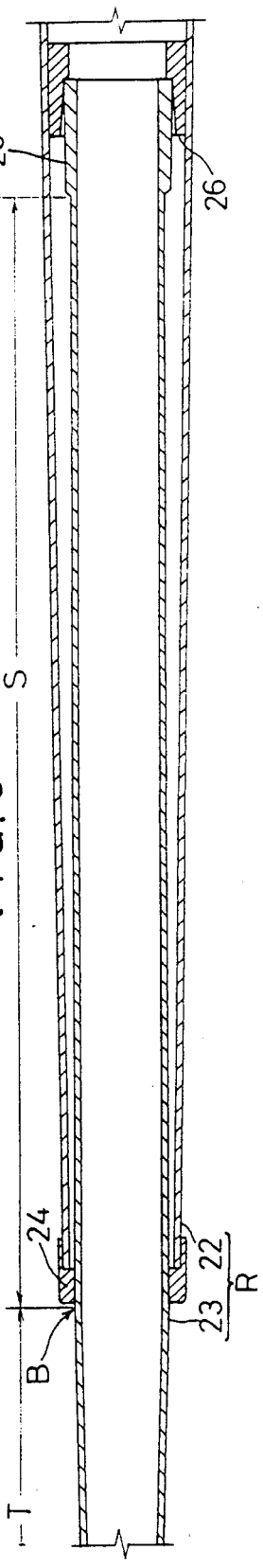

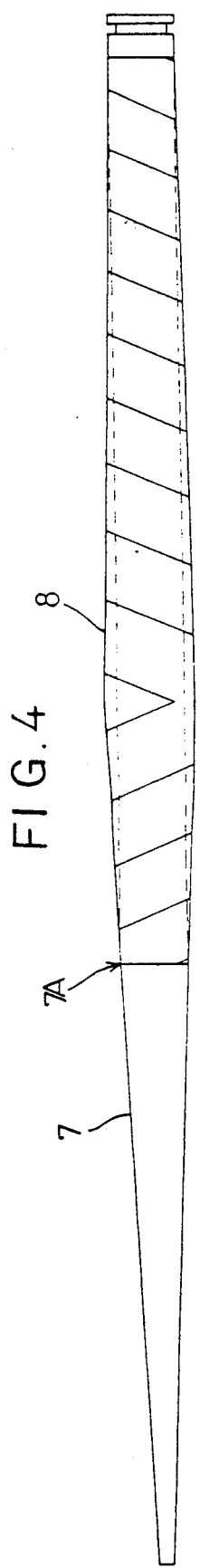
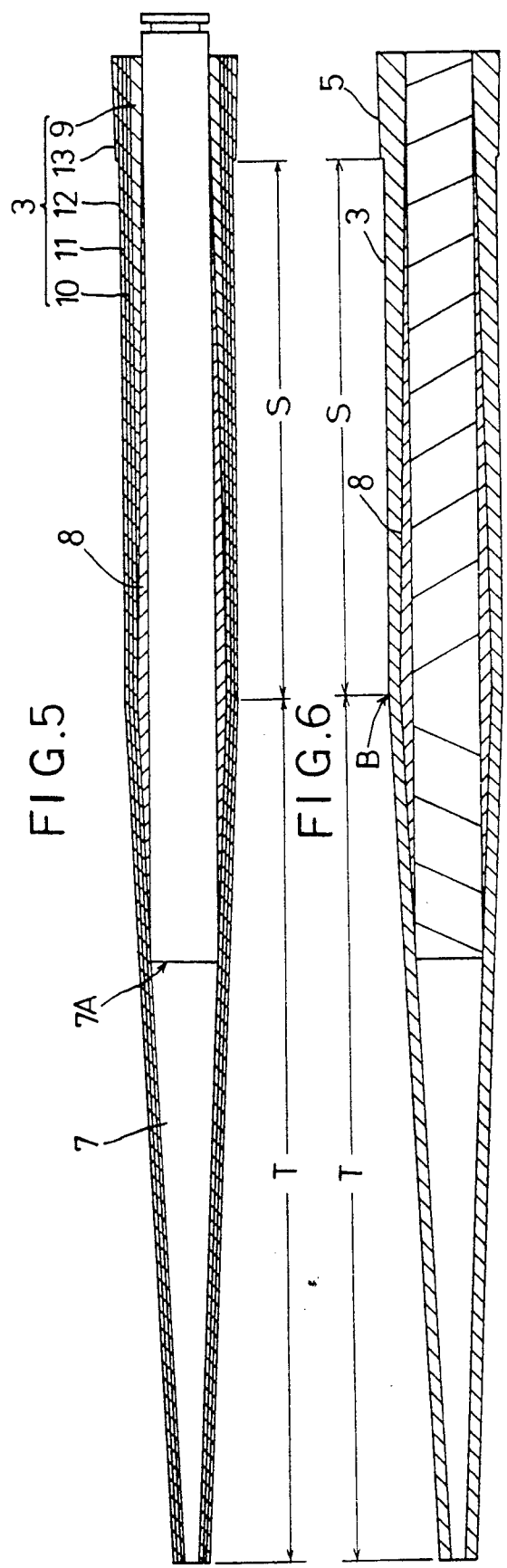
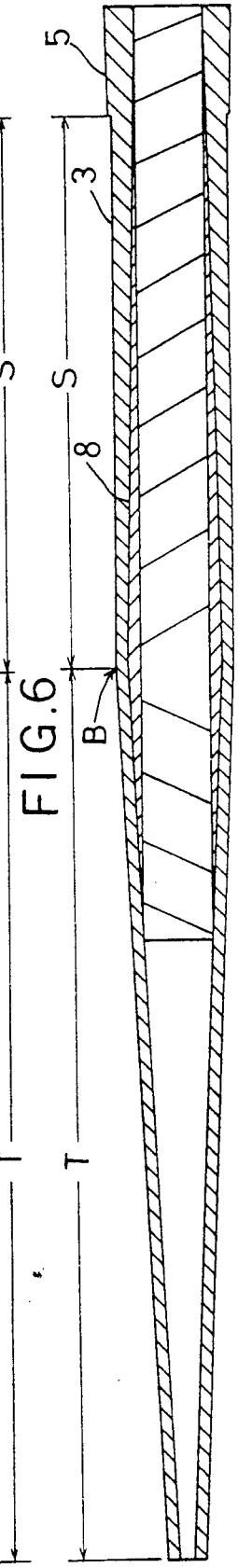
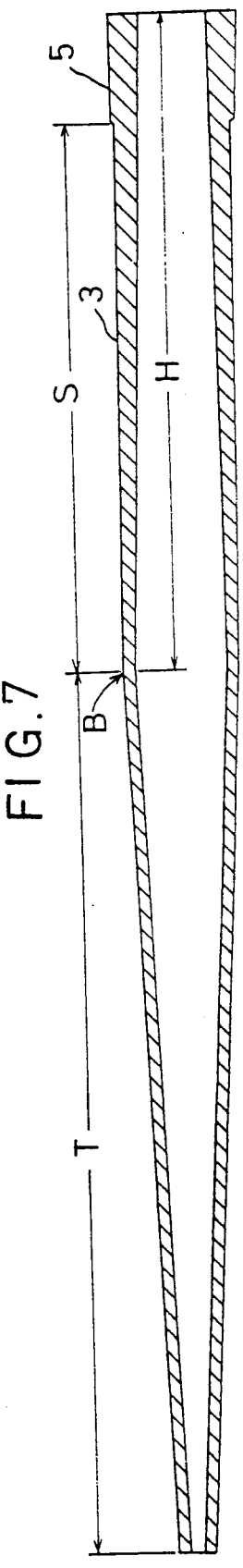

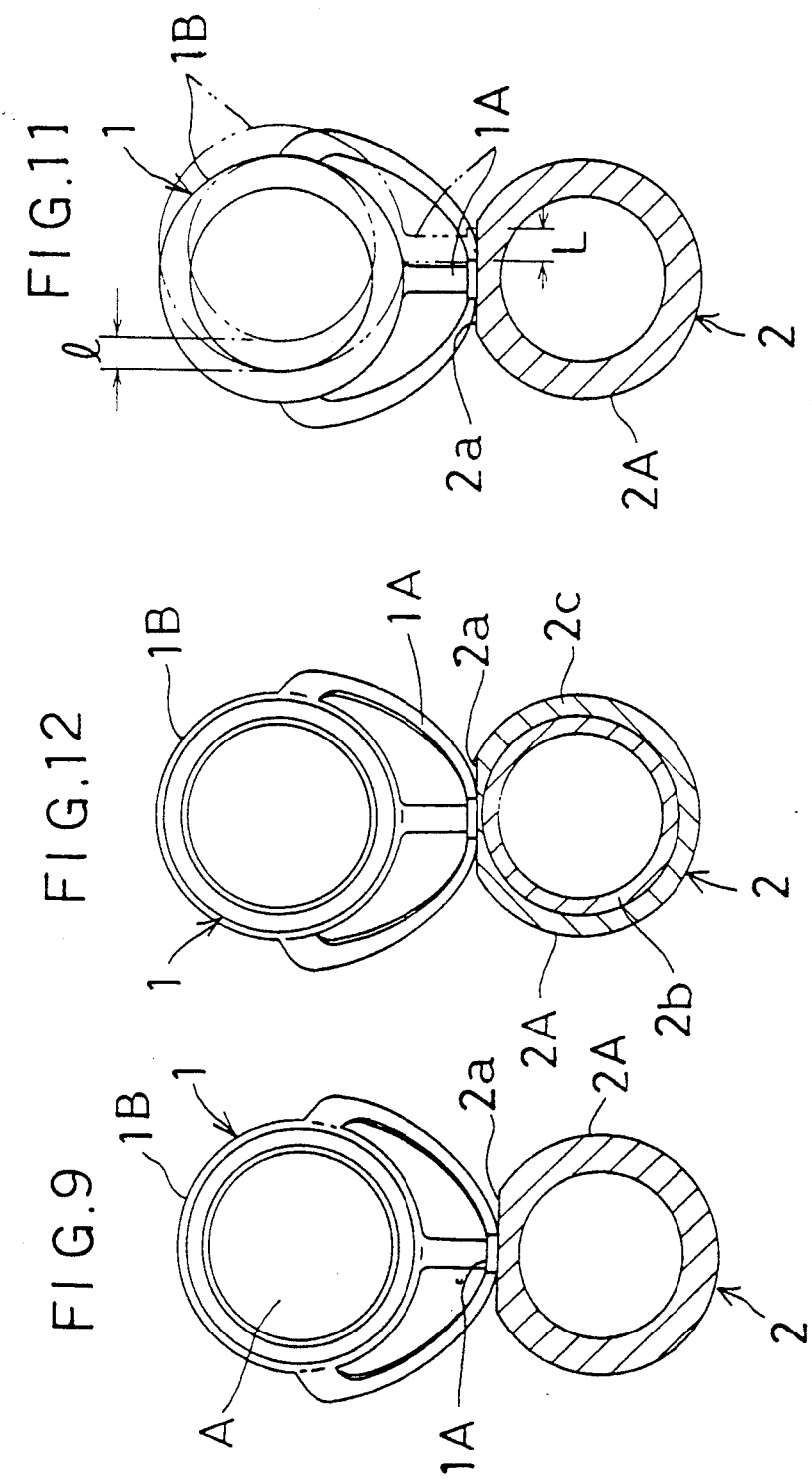

FIG.10
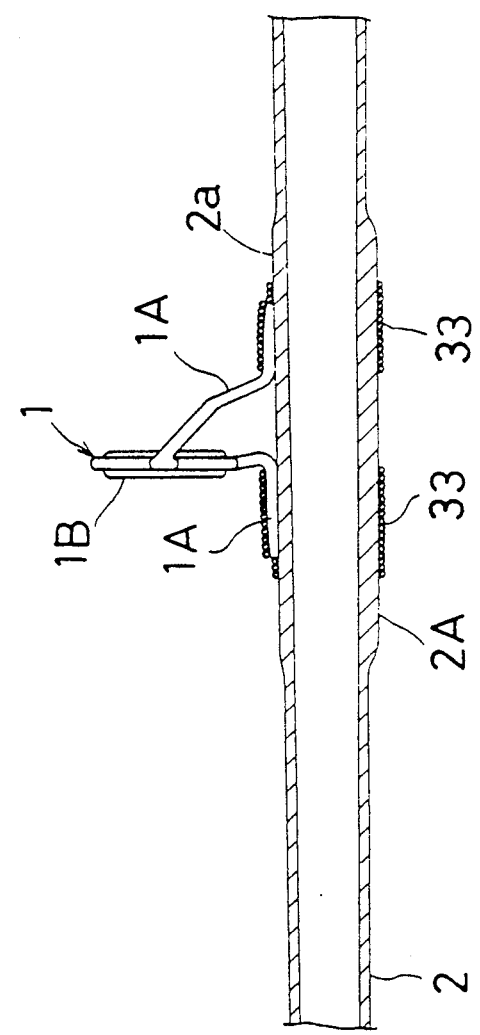
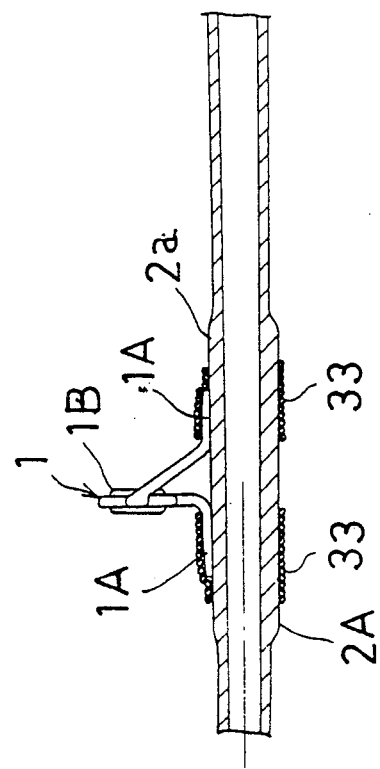

FISHING ROD AND METHOD OF MANUFACTURING SAME

BACKGROUND OF THE INVENTION

1. Field of the Invention

This invention relates to a fishing rod and a method of manufacturing the same. More particularly, the invention relates to a fishing rod having an inner rod section inserted into an outer rod section for telescopic movement, the inner rod section being retainable in an extended position and a compressed position relative to the outer rod section, and to a method of manufacturing such a fishing rod.

2. Description of the Related Art

A known example having the above construction is disclosed in Japanese Utility Model Publication Kokai No. 1989-49071. In this example, a rod stock includes an inner rod section and an outer rod section which may be set an extended state with respect to each other. By setting the two rod sections to a compressed state, adjustment may be made to the rod conditions, restraint of swinging of the rod under wind pressure, and position of the contrivance when taking a fish off the hook.

Consideration is made now of adjustment made to conditions of a rod having a relatively small diameter, such as a lure rod, by setting the rod to an extended state or a compressed state as noted above. Where the outer rod section has a straight outer surface in a rear end region thereof extending over a length corresponding to a sliding range of the inner rod section, "clattering" may advantageously be eliminated when the rod is in the compressed state.

FIG. 8 shows a conceivable example in which an inner rod section 23 includes a rearward straight portion S, and an outer rod section 22 includes a slide contact portion 24 formed at a forward end thereof and having an inside diameter to fit tight on the straight portion S. The outer rod section 22 also includes an engaging portion 26 formed therein for fitting on a large diameter portion 25 at a rear end of the inner rod section 23. When the inner rod section 23 is extended, the large diameter portion 25 of the inner rod section 23 is press fit and supported in the inside wall at the forward end of the outer rod section 22 as in a swing-out rod. When the inner rod section 23 is retracted, the compressed state is maintained without "clattering", by contact between the straight portion S and slide contact portion 24 and engagement between the large diameter portion 25 of the inner rod section 23 and engaging portion 26.

With the inner rod section 23 having such a configuration, however, flexural strength is averaged for the portion rearwardly of a boundary B between a tapered portion T and the straight portion S. This results in a fishing rod having a different action to conventional fishing rods, which is not necessarily easy to handle.

SUMMARY OF THE INVENTION

An object of the present invention is to provide an improved telescopic fishing rod which is easy to handle and retains the advantage of the construction having an inner rod section defining a straight portion.

The above object is fulfilled, according to one aspect of the present invention, by a fishing rod comprising an outer rod section, and an inner rod section inserted into the outer rod section for telescopic movement, the inner rod section being retainable in an extended position and a compressed position relative to the outer rod section, wherein the inner rod section includes a tapered portion extending from an intermediate position to a tip end thereof and tapering toward the tip end, and a straight portion extending substantially straight from the intermediate position to a rear end, the inner rod section defining a horn-like inside wall becoming progressively thicker from a boundary between the tapered portion and the straight portion to the rear end.

In another aspect of the invention, a method of manufacturing a fishing rod is provided which comprises the steps of winding a polypropylene sheet, to form an intermediate swell, around a mandrel having a tapered outer surface tapering from an intermediate position to a forward end, and a straight outer surface from the intermediate position to a rear end thereof; winding a prepreg on the polypropylene sheet such that an outer surface thereof rearwardly of the intermediate swell extends parallel to the straight outer surface of the mandrel; baking a resulting product; pulling out the mandrel; peeling off the polypropylene sheet, thereby to complete an inner rod section; and fitting the inner rod section in an outer rod section.

FIGS. 1 and 2 show a fishing rod as constructed above. An inner rod section 3 has an increasing wall thickness from a boundary B between a tapered portion T and a straight portion S to a rear end region thereof. When a bending load acts on the inner rod section 3, its bending amount is the less toward the rear end, which assures an ordinary action of the fishing rod.

Since the inner rod section 3 includes the straight portion S, a simple structure having a slide contact portion 4 formed in a forward end of the outer rod section 2 is effective to reduce "clattering" between the inner and outer rod sections 2 and 3 and to allow action of the entire fishing rod to be varied with ease.

Thus, action of the entire fishing rod is readily variable by a relatively simple operation to extend or compress the rod. An improved telescopic type fishing rod has been realized which performs smooth action and is easy to handle despite the straight portion of the inner rod section.

Other features and advantages of the present invention will be apparent from the following description.

BRIEF DESCRIPTION OF THE DRAWINGS

The drawings show fishing rods according to the present invention, in which:

FIG. 1 is a partial sectional view of a lure rod in an extended state.

FIG. 2 is a partial sectional view of the lure rod in a compressed state.

FIG. 3 is a side view of the entire lure rod,

FIGS. 4 through 7 are sectional views showing successive manufacturing stages of an inner rod section.

FIG. 8 is a sectional view of a comparative example,

FIG. 9 is a cross section of a fishing rod in a different embodiment of the invention, FIG. 10 is a vertical section of a principal portion of the fishing rod shown in FIG. 9, FIG. 11 is a cross section illustrating an assembly error, and FIG. 12 is a cross section of a further embodiment of the present invention.

DETAILED DESCRIPTION OF THE PREFERRED EMBODIMENTS

A fishing rod and a method of manufacturing the fishing rod according to the present invention will be described with reference to the drawings.

As shown in FIG. 3, a lure rod in this embodiment includes a rod member R and a grip, the rod member R having a plurality of guides 1.

As shown in FIGS. 1 and 2, the rod member R includes an outer rod section 2 continuous with the grip G, and an inner rod section 3 inserted into the outer rod section 2 for telescopic movement. The condition of the entire rod member R is adjustable by the telescopic movement of the rod sections 2 and 3.

The outer rod section 2 has a tubular configuration gently tapering forwardly and having a substantially uniform wall thickness. The inner rod section 3 includes a tapered portion T gradually tapering from an intermediate position to a tip end thereof, and a straight portion S extending straight from the intermediate position to a rear end. The inner rod section 3 has a substantially uniform wall thickness from a boundary B between the tapered portion T and straight portion S to the tip end, and defines a horn-like inside wall H becoming progressively thicker from the boundary B to the rear end.

The outer rod section 2 of this lure rod includes a slide contact portion 4 formed at a forward end thereof having an inside diameter for tight contact with the straight portion S. The outer rod section 2 further includes an engaging portion 6 engageable with a large diameter portion 5 at the rear end of the inner rod section 3. Thus, when the inner rod section 3 is extended, as shown in FIG. 1, the large diameter portion 5 of the inner rod section 3 is press fit and supported in the inside wall at the forward end of the outer rod section 2 as in a swing-out rod. When the inner rod section 3 is retracted, the compressed state is maintained without "clattering", by contact between the straight portion S and slide contact portion 4 and engagement between the large diameter portion 5 of the inner rod section 3 and engaging portion 6.

The inner rod section 3 defines the horn-like inside wall H having a progressively increasing flexural strength toward the rear end. This construction is employed to avoid irregular or abnormal action of the fishing rod.

The inner rod section 3 is manufactured by the following process:

As shown in FIG. 4, a polypropylene sheet 8 is wound with an intermediate swell around a mandrel 7 having a tapered outer surface tapering from an intermediate position 7A to a forward end, and a straight outer surface from the intermediate position 7A to a rear end thereof. Then, a prepreg 9 is wound thereon such that its outer surface rearwardly of the intermediate swell extends parallel to the straight outer surface of the mandrel 7.

Referring to FIGS. 5 and 6 next, a prepreg 10 is wound in a single ply around the outer surfaces of the sheet 1 and prepreg 9, with fibers of the prepreg 10 oriented longitudinally of the mandrel 7 or in directions perpendicular thereto. Then, a prepreg 11 is wound in two plies with fibers thereof extending perpendicular to the fibers of the prepreg 10. Further, a prepreg 12 is wound in a single ply with fibers extending perpendicular to the fibers of the prepreg 11. Finally, a prepreg 13 is wound to form the large diameter portion 5, and the resulting product is baked.

Next, as shown in FIG. 7, the mandrel 7 is pulled out and the sheet 8 is peeled off. Opposite ends are cut, and a predetermined surface treatment is carried out to complete the rod section 3.

The prepregs 9-13 become fused and integrated together as a result of the baking process, while the polypropylene sheet 8 does not become fused. Thus, the sheet 8 is peeled off with ease, leaving the horn-like inside wall H.

A different embodiment of the present invention will be described next.

A construction for attaching the guides 1 to the fishing rod may conveniently include flat or recessed surfaces defined peripherally of the rod.

If a guide is attached to a flat or recessed surface, a displacement of guide mounting feet results in a corresponding displacement of a line receiving bore. That is, a displacement of guide mounting feet in this case advantageously results in a less displacement of a line receiving bore than in the case of the guide being attached to a curved surface of the rod member.

A recessed attaching surface is even more desirable since a still less displacement of a line receiving bore occurs than when a guide is attached to a flat surface.

With such a construction, a low degree of precision may be adequate for positioning the line receiving bores in a line guide passage, which is the condition to be met when attaching the guides in manufacture of fishing rods. This allows a guide attaching operation to be carried out with increased efficiency.

This embodiment will particularly be described with reference to FIGS. 9 through 11.

A rod member R of a fishing rod has a circular section, which is formed of a carbon fiber reinforced plastic or glass fiber reinforced plastic. The rod member R carries a plurality of fixed guides 1 arranged at intervals along its outer wall. Each fixed guide 1 includes a pair of front and rear mounting feet 1A, and a ring-like line receiver 1B located in a fishing line guide passage A.

Each fixed guide 1 is attached to a mounting portion 2A of the rod member R, which mounting portion 2A has a larger diameter than other portions of the rod member R. The rod member R having such large diameter mounting portions 2A may be manufactured by means for shaping the rod member R to define the large diameter mounting portions 2A and small diameter portions. The outer surface of each mounting portion 2A includes a flat surface serving as a mounting position 2a for supporting the mounting feet 1A of the fixed guide 1. The flat-surfaced mounting position 2a is formed by cutting and polishing part of the periphery of the mounting portion 2A after a shaping process.

The mounting feet 1A of each fixed guide 1 are secured to the mounting portion 2A by winding threads around the mounting portion 2A and the mounting feet 1A placed on the mounting position 2a. An adhesive may be used in place of the threads, or both threads and adhesive may be used.

According to the above embodiment, when the mounting feet 1A are displaced by an amount L as shown in FIG. 11, the line receiver 1B becomes displaced by an equal amount. This assures a less amount of displacement than a mounting position 2a having a curved surface.

Further, the present invention may be worked in the following way:

In the above embodiment, the rod member R includes the large diameter mounting portions and small diameter portions. As shown in FIG. 12, the rod member R may be formed of a small diameter rod body $2b$ and a mounting position defining tubular element $2c$ securely fitted on the rod body $2b$.

Furthermore, the mounting positions of the fixed guides may have recessed surfaces, with the mounting feet of the fixed guides engaged with the recessed surfaces.

Apart from the foregoing embodiments, the present invention is applicable also to a swing-out fishing rod for use on shore. The method of manufacturing the fishing rod is not limited to the illustrated embodiment.

What is claimed is:

1. A fishing rod comprising:
   a tubular outer rod section (2), and
   a tubular inner rod section (3), said inner rod section being inserted into the outer rod section, and said inner rod section being retainable in pulled out and inserted positions relative to the outer rod section, and wherein the inner rod section includes:
   (a) a first portion (T) having a front portion, a rear portion, and a tapered outer surface whose outer diameter increases gradually from the front portion toward the rear portion; and
   (b) a second portion (S) extending longitudinally from the rear portion of the first portion (T), said second portion having a front portion, a rear portion, and an outer surface, wherein the outer surface of the second portion is substantially cylindrical being of substantially constant diameter between the front and rear portions of the second portion, and wherein the thickness of the second portion increases from the front portion of the second portion toward the rear portion of the second portion; and
   wherein substantially the entire length of the second portion (S) is housed inside of the outer rod section (2) when the inner rod section (3) is in its inserted position relative to the outer rod section; and
   wherein substantially the entire length of the second portion (S) is located outside of the outer rod section (2) when the inner rod section (3) is in its pulled out position relative to the outer rod section.

2. A fishing rod as claimed in claim 1, wherein the outer rod section includes a slide contact portion formed at a forward end thereof and having an inside diameter for tight contact with the second portion (S).

3. A fishing rod as claimed in claim 1, wherein said outer rod section further includes an engaging portion engageable with a large diameter portion at the rear portion of the second portion of said inner rod section.

4. A fishing rod as claimed in claim 3, further comprising guides mounted on said outer rod section and said inner rod section for receiving a fishing line.

5. A fishing rod as claimed in claim 4, wherein said outer rod section includes flat outer surfaces each defining a mounting position for securing one of said guides.

6. A fishing rod as claimed in claim 4, wherein said outer rod section includes recessed outer surfaces each defining a mounting position for securing one of said guides.

7. A fishing rod as claimed in claim 1, wherein the first portion has a substantially constant thickness over its entire length.

8. A method of manufacturing a fishing rod, comprising the steps of:
   winding a polypropylene sheet, to form an intermediate swell, around a mandrel having a tapered outer surface tapering from an intermediate position to a forward end, and a straight outer surface from the intermediate position to a rear end thereof,
   winding a prepreg on said polypropylene sheet such that an outer surface thereof rearwardly of the intermediate swell extends parallel to the straight outer surface of said mandrel,
   baking said prepreg,
   pulling out said mandrel,
   peeling off said polypropylene sheet, thereby to complete an inner rod section, and
   fitting said inner rod section in an outer rod section.

9. A method as claimed in claim 8, wherein the step of winding said prepreg is followed by the steps of:
   winding a second prepreg around outer surfaces of said polypropylene sheet and said prepreg, said second prepreg having fibers,
   winding a third prepreg with fibers thereof extending perpendicular to the fibers of said second prepreg, and
   winding a fourth prepreg with fibers extending perpendicular to the fibers of said third prepreg.

10. A method as claimed in claim 9, wherein a fifth prepreg is wound around a rear end portion, before the baking step, to form a large diameter portion for fitting in an engaging portion formed on an inside wall of said outer rod section.

11. A method as claimed in claim 10, wherein a slide contact portion is formed in a forward end region of said outer rod section for retaining said inner rod section in an extended position and a compressed position relative to said outer rod section.

* * * * *